United States Patent [19]

Germonprez

[11] 4,165,399

[45] Aug. 21, 1979

[54] BINDERLESS INK FOR JET PRINTING

[75] Inventor: Raymond L. Germonprez, Neenah, Wis.

[73] Assignee: American Can Company, Greenwich, Conn.

[21] Appl. No.: 950,079

[22] Filed: Oct. 10, 1978

Related U.S. Application Data

[63] Continuation of Ser. No. 634,507, Nov. 24, 1975, abandoned.

[51] Int. Cl.$^2$ ............................................. C09D 11/00
[52] U.S. Cl. ..................................... 427/264; 106/22; 106/32; 106/311; 156/277; 427/261
[58] Field of Search ....................... 106/22, 20, 21, 23, 106/32, 62.1, 311; 156/277; 427/264

[56] References Cited

U.S. PATENT DOCUMENTS

| | | | |
|---|---|---|---|
| 2,356,065 | 8/1944 | Keating | 106/22 |
| 3,687,887 | 8/1972 | Zabiak | 260/29.6 WB |
| 3,705,043 | 12/1972 | Zabiak | 106/22 X |
| 3,846,141 | 11/1974 | Ostergren et al. | 106/22 |
| 3,912,520 | 10/1975 | Miyajima et al. | 106/22 |
| 3,994,736 | 11/1976 | Hertz et al. | 106/22 |
| 4,026,713 | 5/1977 | Sambucetti et al. | 106/22 X |
| 4,136,076 | 1/1979 | Daniels | 260/29.6 HN |

*Primary Examiner*—Richard B. Turer
*Attorney, Agent, or Firm*—Robert P. Auber; Ira S. Dorman; George P. Ziehmer

[57] ABSTRACT

Binderless ink compositions suitable for use in jet printing operations on polymeric resin surfaces to form images which are highly resistant to abrasion and to steam pasteurization conditions by virtue of penetration of the colorant into the sub-surface structure of the resin, in contrast to conventional ink images secured on the surface of a substrate by binders incorporated in the ink composition. The preferred inks contain a basic or neutral dye, a water and alcohol solvent system, a surfactant, an aliphatic ketone or ester and, as a preferred optional agreement, an aliphatic hydrocarbon of 8-12 carbons.

12 Claims, No Drawings

BINDERLESS INK FOR JET PRINTING

This is a continuation of application Ser. No. 634,507, filed Nov. 24, 1975, now abondoned.

This invention relates generally to ink compositions for use in ink jet printing apparatus and more particularly to inks specifically formulated for the ink jet printing of production code indicia on food and beverage cans having bodies and/or ends made of thin sheet steel coated with a protective and rust preventive coating of a polymeric resin. The ink compositions of this invention are also of particular value in printing indicia on formed bodies constituted of, or coated with, any of a variety of polymeric resins as will be described in detail hereinafter.

BACKGROUND OF THE INVENTION

Metal cans constitute a very widely utilized medium for the protective packaging of a great variety of products, many millions of cans being used daily for packaging of foods, beverages and many other materials. For many years, the common metal can was constructed of tin-plated steel, and was customarily referred to in the industry as an ETP can, the initials standing for "electro-tin-plated". Containers of this type are referred to by the public at large as "tin cans". In recent years, however, the metal can industry has developed organic polymeric resinous coatings for metal cans which offer substantially the same protection to the steel as the traditional thin coating of metallic tin. These organic resin based coatings have been applied both as a top coat over the traditional thin tin coating and as the sole protective coating composition applied directly to the steel can body and/or end components to yield both resin coated ETP cans and resin coated untinned steel cans which are now referred to in the industry as "tin-free steel" or TFS cans. This invention is directed primarily to ink compositions suitable for printing identifying indicia on the resin coated surfaces of TFS and coated ETP cans and can components by means of ink jet printing techniques.

Manufacturing and processing concerns which package various products in metal cans have found it highly desirable to print, at some point on the can surface, a series of coded symbols which carry information of interest primarily to the packager, including the particular machine on which the can was packed, the date and time of packing and perhaps even the identity of the machine operator. Such data are useful in case it is necessary to trace any particular can or cans after they have been packed.

Many of the products packaged in metal cans are subjected to conditions of high temperature and high moisture during pasteurization or sterilization procedures carried out before or after the can is filled with product and sealed. In order to be commercially satisfactory, the coded indicia printed on the cans must be capable of withstanding these processing conditions as well as being resistant to rubbing abrasion.

The invention of this application relates to ink compositions for use in a printing apparatus operating on the so-called "ink jet printing" principle. Ink jet printing is a recent development in the art of applying identifying and decorative indicia to a base. In general terms, a fluid ink is forced, under pressure, through a very small orifice in an orifice block which contains a piezoelectric crystal vibrating at high frequency (50–100,000 vibrations per second) causing the ink passing through the orifice to be broken into minute droplets equal in number to the crystal vibrations. The minute droplets are passed through a charging area where individual droplets receive an electrical charge in response to a video signal, the amplitude of the charge being dependent on the amplitude of the video signal. The droplets then pass through an electrical field of fixed intensity, causing a varied deflection of the individual droplets dependent on the intensity of the charge associated therewith, after which the deflected drops are allowed to impinge on the base medium which is to receive the decorative or informative printed indicia. Apparatus suitable for carrying out the ink jet printing process is described in detail in U.S. Pat. Nos. 3,465,350 and 3,465,351, issued Sept. 2, 1969, and it is in connection with an apparatus and process such as are described in the aforementioned patents that the ink of the present invention is designed to function.

In order to operate satisfactorily in an ink jet printing system, an ink must display a consistent breakup length, drop velocity and drop charge under set machine operating conditions. To achieve these ends, the ink must meet strict requirements with regard to viscosity and resistivity, solubility and compatibility of components, stability and anti-skinning properties and must readily re-dissolve in a suitable solvent for rapid cleanup of the machine components with a minimum of effort.

It has been determined that the workable range of viscosity of an ink which is to be used in a jet printing apparatus in which the nozzle orifice is 0.003 in. in diameter, must be no more than about 5 cps. at 68° F., with about 1.90–2.0 being the most desirable viscosity level for superior performance. The viscosity may be somewhat higher than the above values if the orifice diameter is increased to 0.005 in., for example, but in any case an ink of less than 10 cps. and preferably less than about 5 cps. at 68° F., is highly desirable. Resistivity may range from somewhat less than 100 ohm-cm. to about 1500 ohm-cm., the most desirable value being between about 150 and 300 ohm-cm. Resistivity in excess of about 1500 ohm-cm. creates problems in obtaining the proper charge on the droplets and therefore the deflectability of the droplets in an electric field is erratically impaired.

The orifice through which the ink must pass is normally in the range of 0.002 in. to 0.005 in. in diameter. In order to prevent plugging of this orifice, it is highly desirable that all components of the ink be in solution in the carrier medium rather than in a colloidal or other suspended state. In any case, the complete ink composition must pass at least a 2 micron filter in order to be satisfactory for use. Further, the ink components must not sludge out or otherwise deposit in any of the transporting lines, the supply tank, the orifice or any other portion of the ink supply system, even though the solvent medium of the ink is subject to a certain amount of evaporation in the ink return system and the supply tank. In other words, the solvent medium must have a reserve solubility for the solute components of the ink in order to prevent any undesired precipitation which could clog or plug the minute jet orifice. The ink must also possess anti-skinning properties to prevent skinning over of the orifice or the tank during periods of shutdown. Any skin formed in such circumstances could then break up into small solid particles which could plug the orifice.

In order to facilitate cleanup of the apparatus after use, the ink components should be readily soluble in a common solvent medium. This will prevent any gradual buildup of ink residues in the system which could result in malfunction.

The ink properties set forth above are primarily established by the requirements of the jet printing apparatus. In addition to these requirements, the ink must possess certain other properties which are specifically related to its intended use in the printing of metal cans and, in particular, coated steel can bodies intended for the packaging of foodstuffs and beverages.

For example, the ink must properly wet the coated can surface on which the printed indicia are to appear. If the ink is of such composition that it fails to readily wet the coated metal surface, the ink will bead up on the surface and fail to adhere properly to it. In extreme cases, the beaded drops will coalesce into larger droplets which run and make the printing completely unintelligible. The problem is often accentuated by oily or greasy residues left on the can surface from earlier stages of fabrication of the container. On the other hand, if the ink is of such composition as to wet the coated metal surface too readily, the ink drops will flatten out and spread by "crawling" on the surface, diluting the color intensity of the ink and overlapping the image of adjacent dots and spreading out sufficiently to make the printed image fuzzy and the characters unintelligible.

In addition to the requirement of proper wetting of the surface to be printed, the droplets of ink must adhere strongly to the surface after application and drying so that the printed matter is resistant to both physical rubbing or abrasive action and also is resistant to moisture. The ability of the ink to form and retain a desired image on a TFS or coated ETP can surface in the presence of moisture and the ability to resist removal by moisture is of great importance in this application because the metal can surfaces are generally damp before, during and after the printing operation. It is particularly difficult to maintain satisfactory adhesion of the ink to metal cans which are subjected to pasteurization, the combination of moisture and high temperature utilized in this process tending to cause the coloring matter to bleed, and to severely reduce the adherance of the ink to the can body so that it is readily removed by subsequent rubbing or abrasion.

It is an object of the present invention to provide ink compositions which will perform satisfactorily in ink jet printing apparatus to print on the surface of TFS cans identifying indicia which are resistant to abrasion and to the effects of the high temperature and moisture associated with steam pasteurization or sterilization processes. It is also an object of this invention to provide an ink suitable for ink jet printing on coated metal cans such as those used for the packaging of foods and beverages. It is a particular object of this invention to provide a jet printing ink for printing indicia on polymer resin coated metal cans which are to be subsequently submitted to pasteurization. Further objects will become evident from a consideration of the following specification and claims.

Most conventional fluid printing inks include three basic components. The first is a colorant for providing visibility of the printed indicia in contrast to the substrate surface. The colorant may be either a dye which is soluble in the ink solvent medium or a pigment which is suspended in the solvent medium. The second component is a resin or binder which remains on the substrate surface after printing and serves to adhere and bind the dye or pigment in position on the substrate surface. The third major component is the solvent which provides fluidity to the ink and carries in solution or suspension the resin and colorant. In addition to these three components which have heretofore been found in nearly all fluid printing inks, various other ingredients may be utilized, including drying, dispersing and wetting agents, plasticizers, diluents and the like. Ink jet printing inks, in addition to the three basic components above mentioned, may also desirably contain a fourth, optional component made appropriate to the ink composition by the nature of the apparatus and process of ink jet printing. This is an electrolyte, which is added so that the ink droplets may be given a strong, reproducibly variable electric charge which in turn enables a controlled, reproducible reflection of the droplets by application of an electrical field to the droplet stream. Printing processes other than ink jet printing do not require inks with electrical properties capable of achieving these ends.

SUMMARY OF THE INVENTION

The objectives of this invention are achieved by ink compositions which contain no tackifying resinous binder and in which the solvent system is composed of a homogeneous blend of water, a lower aliphatic alcohol, an aliphatic ketone or ester and, optionally, an aliphatic hydrocarbon, the only other essential components being a soluble colorant and a surfactant which serves the dual functions of homogenizing agent and electrolyte.

The solvent system is so selected as to soften and swell the organic polymer substrate sufficiently to allow penetration of the colorant into the sub-surface structure thereof, whereby the indicia printed on the substrate become highly resistant to abrasion and to conditions of high temperature and humidity encountered in steam pasteurization and sterilization processes.

DESCRIPTION OF A PREFERRED EMBODIMENT OF THE INVENTION

The ink compositions of the present invention differ from conventional inks and from the inks heretofore utilized in ink jet printing both in composition and in the mechanism by which the ink film becomes adhered to the substrate. Conventional inks contain a tackifying, film-forming, resinous binder which serves to bind the colorant to the substrate as an adherent film is formed on the substrate surface upon evaporation of the volatile ink solvents. The inks of the present invention, however, do not include a film-forming resinous binder and consequently do not form a film over the surface of the polymeric coating which covers the surface of a TFS or ETP can. By contrast with previously utilized ink compositions, the inks of the present invention contain solvents which temporarily soften and swell the polymeric resin coating of the TFS can sufficiently to allow the colorant component of the ink to penetrate the surface layers of the polymeric coating. Upon removal of the ink solvents by evaporation, the colorant component of the ink remains embedded in the resinous polymeric can coating, primarily within the coating rather than on the surface thereof. The protective coating of the TFS or coated ETP can thereby serves not only as the substrate for supporting the printed indicia, but also as the binder for the ink which, because of the penetration of the colorant into the internal structure of the coating, becomes an integral part of the coating and is substantially immune to abrasion, in contrast to normal inks which remain as a surface film on the coating with little or no penetration thereof.

In order to be effective in the process of the present invention, the ink solvents must be capable of penetrating any waxy or oily lubricating film residues which remain on the surface of the coated TFS can as a result of the processing steps utilized in stamping and shaping the can components from sheet or roll stock, and must effect temporary softening and swelling of the polymeric resin can coating sufficient to allow penetration of the colorant into the swollen body of the coating. The ink solvents, however, must not dissolve or disrupt the can coating, destroy its adhesion to the metal can surface, or in any other way deleteriously affect the protective properties of the coating.

In the selection of the ink solvents, therefore, consideration must be given to achieving the desired effects on the can coating as well as obtaining the proper solubility for the coloring and other components of the ink and also achieving the desired viscosity and evaporative characteristics, as will be discussed hereinafter.

With regard to the ink solvent effects on the can coating, it has been found that satisfactory solvents or mixtures of solvents may be developed for use with each of the types of protective coatings customarily utilized on TFS or coated ETP cans, including epoxy resins, polyvinyl chloride, acrylic resins, polyamide-epoxy resin, polyamides, melamine modified alkyds, etherified melamine formaldehyde-styrene resins and butadiene-styrene co-polymers. Ketones, aldehydes and acetals are effective solvents for inks used for printing on coatings of the polyvinyl chloride, epoxy, acrylic and styrene-butadiene co-polymer types. Esters and ethers are also effective with epoxy and acrylic type coatings, dimethyl acetamide and halogenated alcohols are effectively used with polyamide resin coatings and polyamide-epoxy resins, while aromatic organic solvents are satisfactory for inclusion in inks for printing on the modified alkyd resins and melamine formaldehyde resins when used as coatings on tin-free steel or ETP can components. In general, the preferred solvents, particularly for use with the epoxy and acrylic type resin coatings predominant in the coated can field are oxygenated organic compounds of either aliphatic, heterocyclic or aromatic type, selected in a particular case for giving rise to the proper degree of softening and swelling of the substrate coating during the jet printing operation, as will be illustrated by specific examples hereinafter.

The properties of the solvent and the characteristics which are imparted to the ink by the solvent are of paramount importance in the present invention. It has been previously pointed out that the overall ink composition must be of relatively low viscosity. Satisfactory results are readily obtainable with inks having a viscosity as high as about 5 cps. at 68° F., and it is possible to operate with ink having a viscosity approaching 10 cps., although the jet printing process becomes increasingly difficult to control as the ink viscosity increases. A viscosity of about 1.90 cps. is considered optimal.

The propensity for the solvent to wet the substrate, as measured by the property of surface tension of the solvent and of the ink composition incorporating it is of great importance and must be carefully controlled. Water, for example, will not properly wet the surface of a TFS can because of its undesirably high surface tension (72 dyne cm. at standard temperature) and inks having a water base are not satisfactory for use in metal can printing, although such inks have been employed in jet printing of paperboard, for example, since paperboard surfaces are readily wet by water. On the other hand, oxygenated solvents such as ketones, alcohols, ethers and esters, which have surface tensions much lower than water, wet TFS cans so readily that the coated metal surface is flooded by the solvent, which spreads out and merges with other droplets to obscure the limits of any indicia printed by use of these solvents. The inks of the present invention, as used on a TFS can surface, are compounded to have surface tensions at 68° F., of between about 22 and 35 dyne cm., the lower portion of this range being generally preferred.

In order to be effective in the formulation of a jet printing ink for metal cans, the solvent medium must readily dissolve sufficient amounts of the dye, the electrolyte and any desirable optional components to achieve the desired level of conductivity and visual impact of the ink composition. Further, since some degree of evaporation of solvent will occur in the ink supply and ink return systems, thereby increasing the solids concentration of the composition in these areas, the solvent must have a reserve solvent power sufficient to prevent precipitation in this situation.

Although evaporation of the solvent from the ink supply and return systems is generally undesirable, it is important that the solvent evaporate sufficiently rapidly from the printed image area in order to leave the printed indicia smearproof and moistureproof fairly promptly after the printing operation is carried out. The solvent blend must achieve a satisfactory balance in evaporative properties between these opposed objectives.

As previously mentioned, in order for an ink to perform satisfactorily in an ink jet printing system, the ink must have a high degree of conductance, or conversely, a low specific resistivity. Since most organic solvent ink systems are deficient in this respect, the compositions of this invention include as necessary components thereof a moderate amount of water and an electrolyte, thereby greatly increasing the conductance of the ink and its ability to accept an electrical charge on the droplets as they are projected at the substrate target to be printed. The addition of water to a basically organic-solvent-system ink tends to reduce the solution stability of the system, and it has been found desirable to include an organic surface active agent in the ink in order to restore and maintain the stability of the ink composition. In this connection, it is most convenient to employ, as the necessary electrolyte, a highly ionized surface active agent such as sodium lauryl sulfate, which thereby serves the dual purpose of providing the necessary conductance to the ink and, at the same time, lending solution stability to the overall ink system, which now includes both water and an organic solvent of somewhat limited compatibility therewith. It is, of course, obvious that separate components may serve these individual roles, the surface active agent being of a non-ionic type and the electrolyte being a salt such as lithium chloride, which has a relatively high solubility in solvent systems such as those utilized herein. In the preferred compositions, however, a single component displaying surface active properties and also being strongly ionized is utilized. Anionic surfactants such as sodium lauryl sulfate, alpha methyl sodium lauryl sulfate and the ether derivatives of sodium lauryl sulfate are most desirable and various cationic surfactants may also be used, although the wetting properties of the cationics are somewhat less satisfactory in the ink systems of this invention than those of the anionic surfactants.

The colorant, or dye, used in the printing inks and process of this invention must dissolve completely in the solvent medium to form a sludge-free solution or be so finely dispersed that the entire composition will pass at least a 2 micron filter. The colorant which is preferred for its color intensity, stability and compatibility with the other components of the inks of this invention is Victoria Blue FGA, although other dyes of the basic type, including rhodamine, methyl violet, crystal violet, chrysoidine and auramine are also satisfactory and may be used in concentrations varying in accordance with the depth of color desired, within the solubility limits of the particular dye, of course. Victoria blue, rhodamine and methyl violet, for example, may be incorporated in amounts ranging from 0.5% up to as much as about 5% by weight of the ink, although from 1 to 3% of any of these dyes is generally considered to give adequate color intensity and higher percentages are therefore usually thought to be economically undesirable. Also suitable are neutral dyes such as the oil soluble azo dyes and disperse anthraquinone type dyes. Acid dyes are generally not satisfactory in the compositions of this invention.

EXAMPLE 1

The following composition represents a preferred embodiment of the invention, the proportions of the various ingredients being given in percent by weight:

|  | Wt. % |
|---|---|
| 2-heptanone | 57 |
| methyl alcohol | 12.5 |
| 1-decene | 3 |
| sodium lauryl sulfate | 12.5 |
| water | 14 |
| dye (Victoria Blue FGA) | 1 |
|  | 100 |

TFS cans, coated with an epoxy resin coating, were printed with the ink of the above composition by known ink jet printing techniques with excellent results, both as to the legibility of the printed indicia and their durability when subjected to steam sterilization procedures customarily employed in the canned food and beverage industry and to abrasion tests which substantially obliterate indicia printed with standard, commercially available inks.

In the above composition, other aliphatic ketones ranging in molecular structure from 2-butanone to 2-octanone may be substituted for 2-heptanone with substantially comparable results, although 2-heptanone is preferred as having the optimum combination of evaporative and wettability properties. Higher molecular weight ketones are somewhat slower to evaporate, thus limiting the speed of the printing operation, whereas the lower molecular weight ketones evaporate so rapidly that the ink does not achieve optimum penetration into the interior structure of the polymeric resin coating on the metal can surface. Other suitable oxygenated aliphatic solvents which may be substituted in whole or in part for the 2-heptanone in the above composition include esters such as ethyl, propyl and butyl acetate.

The function of the decene in the above composition is to cut through or penetrate the thin layer of oily material which serves as a lubricant on the resin coated metal surfaces of can components in the can forming operations. Other effective grease-cutting aliphatic hydrocarbon solvents having carbon chains of between 8 and 12 carbons, including decane, dodecene, nonane, octane or isoctane may be substituted, if desired, although decene is preferred as having the optimum evaporative properties. A solvent of this nature is not necessary if the substrate being printed does not have an oily surface. Molded plastic products and many plastic resin coated substrates are free of such oily residues and decene type solvents are not required in the ink composition in printing on such substrates.

The methyl alcohol component lends homogeneity to the composition and may enhance conductivity. It may range from about 8 to about 25 percent by weight in the composition, the lower limit being established by the necessity to keep the dye and 2-heptanone in solution and the upper limit to prevent separation of the surfactant. Ethyl alcohol, normal propyl alcohol or isopropyl alcohol may be substituted in whole or in part for the methyl alcohol utilized in the above composition. Methyl alcohol is preferred because of the lesser effect which variations in the concentration of this solvent has on the conductivity of the ink. Inks wherein ethyl or propyl alcohols are used are relatively sensitive in this respect and frequently show a high specific resistivity (poor conductance) if the concentration of the alcoholic component is increased by even a comparatively slight degree.

The presence of water in the ink composition assures sufficient electrolytic strength so that the ink performs properly in the jet printing operation. The percentage of water should not exceed about 35%, however, or the composition will not wet the substrate sufficiently to enable the desired degree of drop spreading and penetration.

EXAMPLE 2

Atmospheric conditions may influence the printing properties of a given ink composition, and it is sometimes desirable to compensate for any variation in printing property by a change in the concentration of one or more of the ink components. The following ink composition may be used advantageously under conditions of low atmospheric humidity, for example, although it contains substantially more than the optimum amount of water for use in a humid atmosphere.

|  | Wt. % |
|---|---|
| 2-heptanone | 42 |
| methyl alcohol | 12.5 |
| 1-decene | 7 |
| sodium lauryl sulfate | 12.5 |
| water | 25 |
| dye (Victoria Blue FGA) | 1 |
|  | 100 |

In general, the water content may vary from about 12 to 35 percent, the alcohol component from about 8 to 25 percent, the decene content from zero to 10 percent, depending on the presence or absence of an oily surface film on the substrate, the oxygenated aliphatic solvent of the ketone or ester type may range from about 25 to about 75 percent, the electrolyte from about 8 to about 17 percent, and the dye from about 0.5 to about 5 percent, depending on solubility and depth of color desired.

EXAMPLE 3

Substitution of all or part of a given solvent component by a substantially equivalent material often requires minor changes in concentration of some of the other components in order to maintain a stable ink composition of balanced properties. In the following ink composition, for example, a portion of the preferred 2-heptanone is replaced with 2,4-pentanedione, a solvent of somewhat greater polarity than heptanone. This in turn requires an increase in the 1-decene concentration to maintain the desired degree of wetting on a lubricated surface. The water concentration in this composition is relatively high, making it suitable for use in conditions of low humidity.

|  | Wt. % |
|---|---|
| 2,4-pentanedione | 22.5 |
| 2-heptanone | 22.5 |
| methyl alcohol | 8 |
| 1-decene | 9 |
| sodium lauryl sulfate | 12 |
| dye (Malachite green) | 1 |
| water | 25 |
|  | 100 |

The above composition has been shown to be very effective for printing on the surface of epoxy or acrylic resin coated steel which carried a thin, oily surface film of a lubricant as a result of the stamping operations common to the manufacture of food and beverage cans.

The dye used in this composition may be replaced with 1–2% of any of a variety of similar dyes of the basic triphenyl methane type.

I claim:

1. A binder-free ink composition, suitable for use in jet ink printing and capable of bonding to synthetic polymeric resin surfaces by penetration of the ink into the sub-surface structure of the resin, which consists essentially of a homogenous blend of:
   (a) between about 24 and 75 weight percent of an organic solvent selected from the group consisting of aliphatic ketones ranging in molecular structure from 2-butanone to 2-octanone, aliphatic esters and mixtures thereof;
   (b) between about 8 and about 25 percent by weight of an aliphatic monohydric alcohol of no more than three carbon atoms, the upper limit of said percent of alcohol present in the composition being so selected as to prevent phase separation of the surfactant component;
   (c) between about 8 and 17 percent by weight of an anionic surfactant;
   (d) between about 12 and 35 percent by weight of water;
   (e) between about 0.5 and 5.0 percent by weight of a dye selected from the group consisting of basic dyes and neutral dyes, and
   (f) between zero and 10 percent by weight of an aliphatic hydrocarbon having 8 to 12 carbon atoms;
   said ink composition having a viscosity at 68° F. of less than 10 cps., a specific resistivity of less than 1500 ohm.-cm. and a surface tension at 68° F. of between 22 and 35 dyne cm.

2. A binder-free ink composition as claimed in claim 1 wherein said solvent is an aliphatic ketone.

3. A binder-free ink composition as claimed in claim 2 wherein said aliphatic ketone is 2-butanone, 2-pentanone, 2-hexanone, 2-heptanone, 2-octanone or 2,4-pentanedione.

4. A binder-free ink composition as claimed in claim 1 wherein said solvent is an aliphatic ester.

5. A binder-free ink composition as claimed in claim 4 wherein said aliphatic ester is ethyl acetate, propyl acetate or butyl acetate.

6. A binder-free ink composition, suitable for use in jet ink printing of polymeric resin coated metal substrates and capable of bonding to said polymeric resin by penetration of the ink into the sub-surface structure of the resin, which consists essentially of a homogeneous blend of:
   (a) between about 25 and 75 weight percent of an aliphatic ketone selected from the group consisting of 2-butanone, 2-pentanone, 2-hexanone, 2-heptanone, 2-octanone or 2,4-pentanedione and mixtures thereof;
   (b) between about 8 and 25 weight percent of a monohydric alcohol selected from the group consisting of methanol, ethanol or propanol and mixtures thereof; the upper limit of said percent of alcohol present in the composition being so selected as to prevent phase separation of the surfactant component;
   (c) between about 8 and 17 weight percent of a sodium lauryl sulfate surfactant;
   (d) between about 12 and 35 weight percent of water;
   (e) between about 0.5 and 5.0 weight percent of a basic or triaryl methane dye; and
   (f) between 0 and 10 weight percent of an aliphatic hydrocarbon having 8 to 12 carbon atoms said ink having a viscosity at 68° F. of less than 10 cps., a specific resistivity of less than about 1500 ohm.-cm. and a surface tension at 68° F. of between 22 and 35 dyne cm.

7. A binder-free ink composition, suitable for use in jet printing and capable of bonding to synthetic polymeric resin coated metal substrates by penetration into the sub-surface structure of the resin, which consists essentially of a homogenous blend of:
   57 weight percent of 2-heptanone
   12.5 weight percent of methyl alcohol
   12.5 weight percent of sodium lauryl sulfate
   3 weight percent of 1-decene
   1 weight percent of a basic dye
   14 weight percent of water.

8. A binder-free ink composition, suitable for use in jet ink printing of polymeric resin coated metal substrates and capable of bonding to said polymeric resin by penetration of the ink into the sub-surface structure of the resin, which consists essentially of a homogeneous blend of:
   (a) between about 25 and 75 weight percent of an aliphatic ester selected from the group consisting of ethyl acetate, propyl acetate and butyl acetate and mixtures thereof;
   (b) between about 8 and 25 weight percent of a monohydric alcohol selected from the group consisting of methanol, ethanol or propanol and mixtures thereof; and upper limit of said percent of alcohol present in the composition being so selected as to prevent phase separation of the surfactant component;
   (c) between about 8 and 17 weight percent of a sodium lauryl sulfate surfactant;

(d) between about 12 and 35 weight percent of water;
(e) between about 0.5 and 5.0 weight percent of a basic or triaryl methane dye; and
(f) between 0 and 10 weight percent of an aliphatic hydrocarbon having 8 to 12 carbon atoms, said ink composition having a viscosity at 68° F. of less than 10 cps., a specific resistivity of less than about 1500 ohm.-cm. and a surface tension at 68° F. of between 22 and 35 dyne cm.

9. In a method for depositing indicia on a plastic resin coated metal substrate by a jet ink technique, the improvement which comprises providing a binder-free ink composition capable of bonding to the plastic coating by penetration of the ink into the sub-surface structure of said resin, contacting said plastic surface with said jet ink composition whereby penetration into the sub-surface structure of said plastic is effected and said ink remains embedded in the plastic resin coating upon evaporation of the ink solvents,
said binder-free ink composition consisting essentially of
(a) between about 25 and 75 weight percent of an organic solvent selected from the group consisting of aliphatic ketones ranging in molecular structure from 2-butanone to 2-octanone, aliphatic esters and mixtures thereof;
(b) between about 8 and about 25 percent by weight of an aliphatic monohydric alcohol of no more than three carbon atoms, the upper limit of said percent alcohol present in the composition being so selected as to prevent phase separation of the surfactant component;
(c) between about 8 and 17 percent by weight of an anionic surfactant,
(d) between about 12 and 35 percent by weight of water,
(e) between 0.5 and 5.0 percent by weight of a dye selected from the group consisting of basic dyes and neutral dyes, and
(f) between zero and 10 percent by weight of an aliphatic hydrocarbon having 8 to 12 carbon atoms,
said ink composition having a viscosity at 68° F. of less than 10 cps., a specific resistivity of less than 1500 ohm.-cm. and a surface tension at 68° F. of between 22 and 35 dyne cm.

10. The improvement as defined in claim 9 wherein said plastic coated metal surface comprises a metal container.

11. The improvement as defined in claim 10 wherein said plastic coated metal surface is an epoxy or acrylic resin coated tin-free steel or tinplate container.

12. The improvement as defined in claim 9 wherein said organic solvent is 2-heptanone, said aliphatic alcohol is selected from the group consisting of methyl alcohol, ethyl alcohol and a blend of methyl and ethyl alcohols, said surfactant is sodium lauryl sulfate, said dye is a basic dye and said aliphatic hydrocarbon is 1-decene.

* * * * *